United States Patent [19]

Ladin

[11] 4,296,977
[45] Oct. 27, 1981

[54] SELF-ALIGNING SHAFT BEARING MOUNTING ASSEMBLY

[75] Inventor: Eli M. Ladin, Ann Arbor, Mich.

[73] Assignee: Federal-Mogul Corporation, Southfield, Mich.

[21] Appl. No.: 111,449

[22] Filed: Jan. 11, 1980

[51] Int. Cl.³ .............................................. F16C 13/02
[52] U.S. Cl. ....................................... 308/19; 308/29; 308/181; 308/187.1
[58] Field of Search ................ 308/19, 29, 181, 187.1, 308/194, 189 R; 172/518

[56] References Cited

U.S. PATENT DOCUMENTS

| | | | |
|---|---|---|---|
| 2,097,244 | 10/1937 | Sjogren | 308/181 |
| 2,652,291 | 9/1953 | Magarian | 308/29 |
| 3,098,680 | 7/1963 | Lohman | 308/19 |
| 4,124,257 | 11/1978 | Derner et al. | 308/194 |
| 4,249,782 | 2/1981 | Frank | 308/181 |

Primary Examiner—Lenard A. Footland
Attorney, Agent, or Firm—William G. Coon

[57] ABSTRACT

A self-aligning shaft bearing mounting assembly suitable for rotatably supporting a disc harrow shaft or the like, adapted to be mounted on a framework including a strut having a pair of spaced apart ball-members affixed thereto. An anti-friction bearing is supported by a bearing carrier comprised of a pair of plates formed with a central tubular aperture for clamping the bearing and including a pair of substantially hemispherical sockets disposed at diametrically spaced positions to each side of the central aperture and bearing and slidably overlying the ball portion of the ball members. The bearing carrier includes fastening means for securing the plates together in face-to-face relationship for clamping the bearing in the housing and the ball portions in the socket permitting pivoting self-aligning movement of the carrier about an axis passing through the ball portions.

7 Claims, 3 Drawing Figures

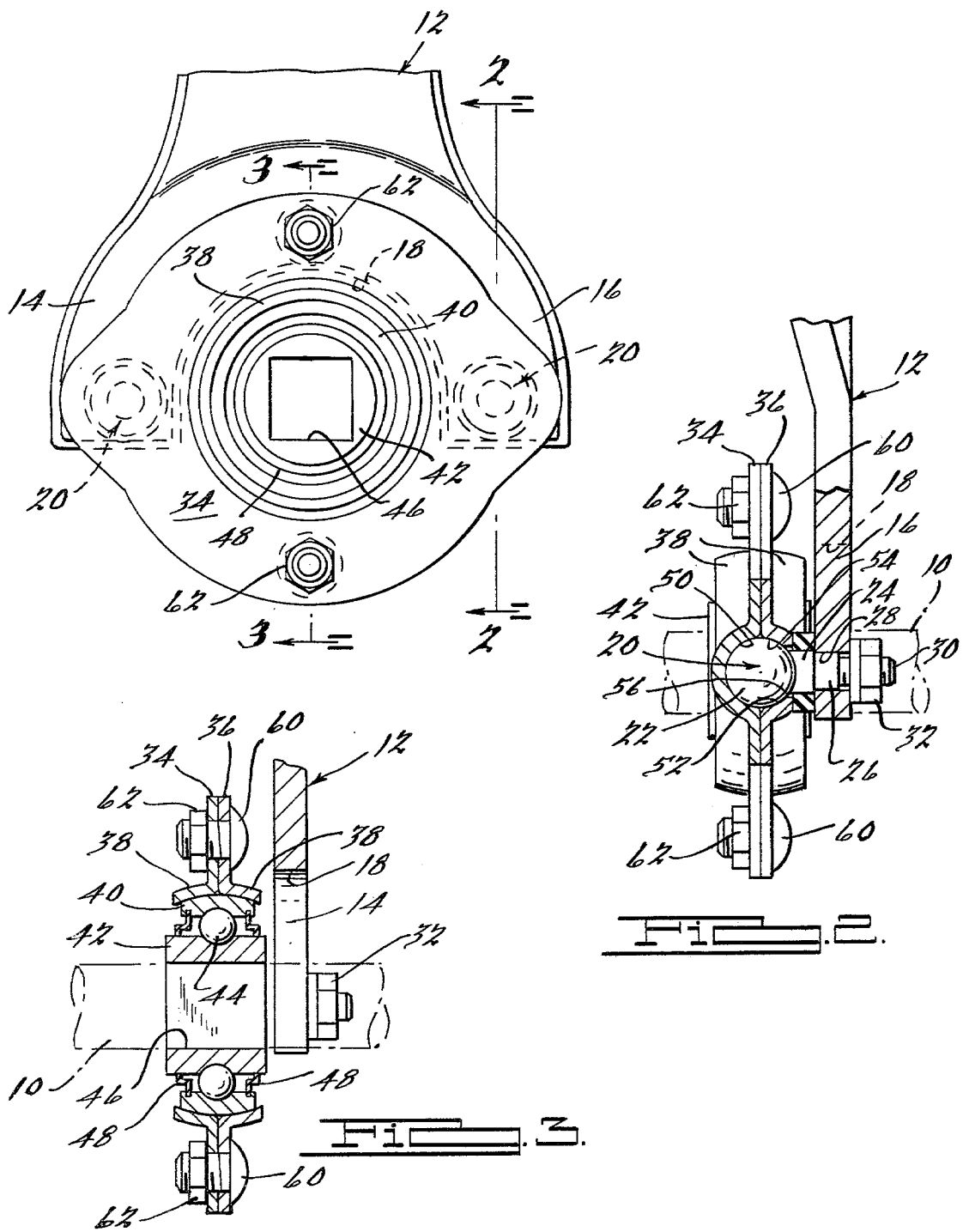

SELF-ALIGNING SHAFT BEARING MOUNTING ASSEMBLY

BACKGROUND OF THE INVENTION

In agricultural implements such as disc harrows, a central shaft is rotatably supported by a plurality of bearings on which a plurality of discs are mounted which are adapted to be drawn by a tractor or the like, to effect a discing or plowing of land. The plane of the discs is inclined at a desired pitch relative to the direction of travel whereby high thrust and radial loads are imposed on the central shaft and harrow framework including the struts on which the bearings are mounted for supporting the shaft. The imposition of such loads causes the central axle and struts or standards to deflect causing a misalignment condition between the axis of rotation of the bearings imposing severe loading on the bearing structure and the seals promoting premature failure.

In recognition of this problem, a variety of bearing mounting assemblies have heretofore been proposed to provide a self-aligning action to reduce or minimize such misalignment conditions and the associated high loading on the bearing. Typical of such prior art constructions are those disclosed in U.S. Pat. Nos. 2,652,291 and 2,097,244. Such prior art constructions have been found to be relatively costly, complex, and difficult to service in the field.

The present invention overcomes the problems and disadvantages associated with prior art self-aligning bearing mounting assemblies by providing a relatively simple, inexpensive, durable and serviceable construction which is versatile in application and readily accommodates misalignment conditions as encountered in farm implement equipment such as disc harrows or the like.

SUMMARY OF THE INVENTION

The benefits and advantages of the present invention are achieved by a self-aligning bearing mounting assembly suitable for supporting a shaft of a disc harrow or the like, including a pair of ball-studs, each terminating with a ball portion and a shank adapted to be affixed in spaced relationship to a supporting structure including a standard or strut. A bearing carrier is pivotally mounted on the ball portions of the ball studs and is comprised of a pair of overlying plates formed with an aligned central aperture and encircling outwardly projecting annular flanges which define a tubular bearing housing within which the periphery of the outer race of an anti-friction bearing is securely clamped. Each of the plates is formed with a pair of substantially hemispherical cavities which define on assembly a pair of ball sockets disposed at diametrically spaced positions on each side of the tubular bearing housing and which overlie the ball portions of the ball-studs. The plates are fastened together by suitable fasteners to effect a clamping of the bearing in the tubular housing and the balls in the sockets permitting pivoting movement of the bearing carrier about an axis passing substantially through the center of the ball portions.

In accordance with a preferred embodiment, the hemispherical cavities of one of the plates are formed with through-bores through which the shank of the ball-studs extends in radial clearance spaced relationship and appropriate sealing means are provided for preventing entry of extraneous matter and contaminating substances into the ball sockets.

Additional benefits and advantages of the present invention will become apparent upon a reading of the description of the preferred embodiments taken in conjunction with the accompanying drawing.

BRIEF DESCRIPTION OF THE DRAWING

FIG. 1 is a front elevational view of the self-aligning bearing mounting assembly affixed to a standard or supporting strut;

FIG. 2 is a vertical transverse sectional view of the assembly shown in FIG. 1 and taken substantially along the line 2—2 thereof; and FIG. 3 is a transverse vertical sectional view through the assembly shown in FIG. 1 and taken substantially along the line 3—3 thereof.

DESCRIPTION OF THE PREFERRED EMBODIMENTS

Referring now in detail to the drawing, a self-aligning shaft bearing mounting assembly is shown which is particularly applicable, but not necessarily limited to rotatably supporting a square shaft or axle 10 as shown in phantom in FIGS. 2 and 3 on which a plurality of discs (not shown) are mounted at longitudinally spaced intervals in a conventional manner. The bearing mounting assembly as shown is mounted on the lower portions of a bifurcated strut or standard 12 having its upper portion securely affixed to a framework which in turn is adapted to be connected to a tractor for pulling or dragging the assembly for plowing the soil.

The lower end portion of the strut 12 is of a bifurcated configuration including a pair of spaced legs 14, 16 separated by a substantially semi-circular aperture or recess 18 through which the shaft 10 extends in clearance relationship. A ball-stud 20 is affixed to each leg 14, 16 and comprises a ball portion 22 integrally connected to a cylindrical shank section 24 disposed coaxial with a reduced section 26 as best seen in FIG. 2 which is slidably disposed in bores 28 extending through the legs 14, 16. The ball-studs 20 terminate in a threaded section 30 for receiving a nut and washer assembly 32 for securely fastening the ball-studs to the strut in spaced apart relationship. The cylindrical shank section 24 of the ball-stud is of a length sufficient to space the ball portion 22 a distance from the adjacent face of the strut to permit angular pivoting movement of the bearing mounting assembly about an axis passing substantially through the center of the two ball portions 22 through an angle sufficient before contacting the face of the strut to correct for misalignment conditions.

The bearing mounting assembly comprises a pair of plates disposed in overlying face-to-face relationship including an outer plate 34 and an inner plate 36 each of which is provided with aligned central apertures defined by outwardly projecting annular flanges 38 integrally formed therewith as best seen in FIG. 3. The annular flanges 38 define in combination a tubular bearing housing within which an anti-friction bearing is clamped against relative rotative and axial movement. In accordance with a preferred practice as shown in FIG. 3, the flanges 38 are of a generally frusto-conical or spherical configuration being of reduced diameter at the outer annular edges thereof so as to define a tubular bearing housing which is of a concave configuration for conformably receiving a correspondingly contoured periphery of an outer race member 40 of the anti-friction bearing assembly effecting a firm clamping relationship therebetween.

The anti-friction bearing assembly as best seen in FIG. 3 is of a conventional construction including the outer annular race 40, an inner annular race 42 and a plurality of anti-friction elements such as balls 44 interposed and constrained in annular raceways therebetween. The inner race 42 is formed with a generally square aperture 46 for slidably receiving the shaft or axle 10 in rotative supporting relationship. The anti-friction bearing further includes a pair of annular seals 48 interposed between the inner and outer races on each side of the balls for sealing lubricant such as grease within the bearing and to further exclude entry of contaminating substances into the interior of the bearing assembly.

The plates 34, 36 and integral annular flanges 38 define in combination a bearing carrier which is pivotally supported on the ball portions 22 of the ball-studs. For this purpose, the inner and outer plates are formed with substantially hemispherical opposed cavities 50, 52, respectively, which are disposed in diametrically spaced relationship on each side of the annular flanges 38 and define in combination a spherical socket 54 for slidably overlying the outer peripheral portion of the ball portions. In order to accommodate the shank section 24 of the ball-studs, the hemispherical cavities 52 are formed with through-bores 56 as best seen in FIG. 2 in the base thereof through which the shank sections extend in radial clearance spaced relationship. A sealing of the balls within the sockets to retain any lubricant and to prevent entry of contaminating substances is achieved by a resilient annular collar 58 overlying the shank section 24 and interposed between the adjacent face of the strut 12 and rearwardly projecting edge of the cavity 52. The resilient annular collar seal 58 is preferably installed under compression in order to retain sealing contact during angular deflection of the bearing carrier about the ball portions.

As shown in the drawing, the inner and outer plates are secured in face-to-face relationship by means of a pair of bolts 60 having a nut 62 on the threaded shank portions thereof which are disposed in bores positioned in diametric spaced-apart relationship relative to the center of the annular flanges 38. A removal of the bolts 60 and nuts 62 enables quick and simple service of the anti-friction bearing assembly or replacement thereof in the field. The bolts and nuts also serve to fasten the inner and outer plates into firm face-to-face abutting relationship effecting a secure clamping of the periphery of the outer race member 40 within the tubular bearing housing and the ball portions within the ball sockets.

It will be apparent from the foregoing description, that the self-aligning bearing mounting assembly is comprised of a carrier that can conveniently be formed from a pair of stamped plates adapted to receive a conventional anti-friction bearing assembly achieving thereby increased simplicity and economy in manufacture and installation.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. A pivotable shaft bearing mounting assembly comprising a supporting strut, a pair of ball-studs each formed with a ball and a shank affixed in spaced relationship to said strut, a bearing carrier comprised of a pair of overlying plates each formed with an aligned central aperture and an encircling outwardly projecting annular flange defining therebetween a tubular bearing housing, a bearing including an annular outer race disposed with its periphery clamped within said housing, an annular inner race adapted to receive and rotatably support a shaft, and a plurality of anti-friction elements interposed between said outer and inner race, each of said plates formed with a pair of substantially hemispherical opposed cavities defining a pair of ball sockets disposed at diametrically spaced positions on each side of said central aperture, said carrier formed with access ports for receiving said shank of said ball-studs in radial-spaced clearance relationship, and fastening means for securing said plates together in face-to-face relationship to clamp said bearing in said housing and said balls in said sockets permitting pivoting movement of said carrier about an axis passing through said balls.

2. The bearing mounting assembly as defined in claim 1 further including sealing means for sealing each ball in each of said sockets.

3. The bearing mounting assembly as defined in claim 2 in which said sealing means comprises a resilient annular collar overlying said shank of each of said ball-studs and interposed between an adjacent surface of said strut and one of said plates.

4. The bearing mounting assembly as defined in claim 1 in which said access ports comprise through-bores in the base of each of said cavities of one of said plates.

5. The bearing mounting assembly as defined in claim 1 in which said annular flange on each of said plates are of an outwardly converging configuration defining said tubular bearing housing having a generally concave cross sectional configuration for receiving the periphery of said outer race having a conforming configuration.

6. The bearing mounting assembly as defined in claim 1 in which said fastening means comprises a plurality of bolts extending through said plates and having nuts threadably secured on the threaded shank portions thereof for removably securing said plates together.

7. The bearing mounting assembly as defined in claim 1 further including annular seal means on said bearing interposed on each side of said anti-friction elements and extending in sealing contact between said outer and said inner race.

* * * * *